United States Patent [19]

Ellion et al.

[11] Patent Number: 5,015,381

[45] Date of Patent: May 14, 1991

[54] SOLID ELEMENT FLUID FILTER FOR REMOVING SMALL PARTICLES FROM FLUIDS

[75] Inventors: M. Edmund Ellion, Arcadia; Philip A. Donatelli, Marina del Rey; George Wolff, Huntington Beach, all of Calif.

[73] Assignee: Hughes Aircraft Company, Los Angeles, Calif.

[21] Appl. No.: 23,175

[22] Filed: Mar. 9, 1987

[51] Int. Cl.⁵ ............................................. B01D 29/44
[52] U.S. Cl. ................................ 210/490; 210/498; 55/278; 156/902; 156/905
[58] Field of Search ............... 210/488, 489, 490, 498; 156/902, 904, 905; 55/278, D44

[56] References Cited

U.S. PATENT DOCUMENTS

| | | | |
|---|---|---|---|
| 3,111,963 | 11/1963 | Brockwell | 210/498 |
| 3,700,111 | 10/1972 | Bode | 210/498 |
| 4,267,045 | 5/1981 | Hoof | 210/498 |
| 4,620,898 | 11/1986 | Banks et al. | 156/904 |
| 4,634,495 | 1/1987 | Gobrecht et al. | 156/904 |
| 4,664,814 | 5/1987 | Bachman et al. | 210/498 |
| 4,681,681 | 7/1987 | Drori | 210/498 |

Primary Examiner—Ernest G. Therkorn
Assistant Examiner—Wanda L. Millard
Attorney, Agent, or Firm—Steven M. Mitchell; Robert A. Westerlund; Wanda K. Denson-Low

[57] ABSTRACT

A fluid filter element, filter, and process for its fabrication, wherein the filter element includes a flat base and a thin layer deposited thereupon having a pattern of channels through which a fluid may flow. In operation, the element is pressed against a flat surface, preferably the back side of another element in a stack of filter elements, whereupon the channels become closed conduits. The channels have a minimum dimension of the thickness of the layer, so that larger particles may not pass therethrough. Fabrication of the thin layer with the channels therein is preferably accomplished by masking a pattern corresponding to the channels and then vapor depositing the remainder of the thin layer, as masking and deposition permits accurate control of the height of the deposited layer, and, then, the minimum dimension of the channels.

17 Claims, 2 Drawing Sheets

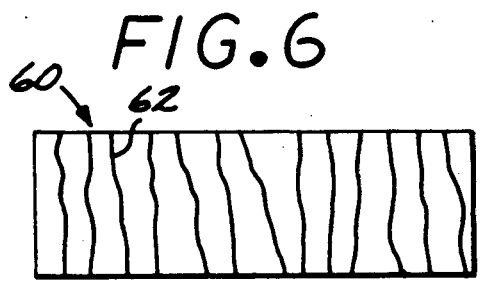
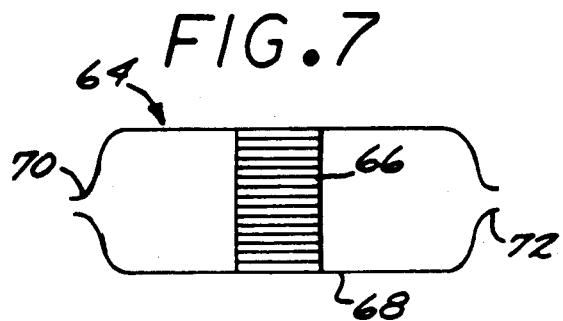
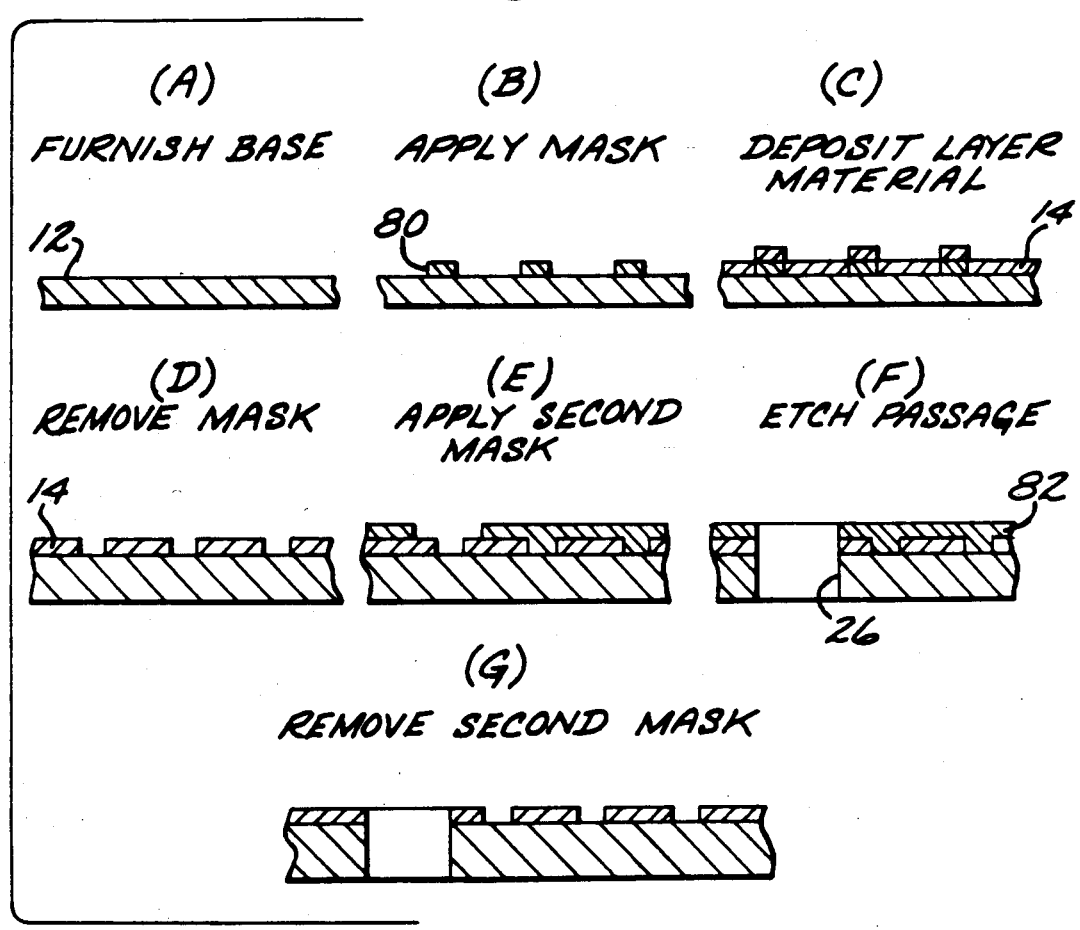
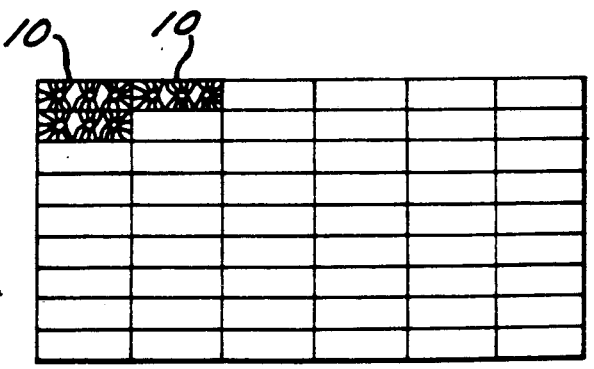

SOLID ELEMENT FLUID FILTER FOR REMOVING SMALL PARTICLES FROM FLUIDS

BACKGROUND OF THE INVENTION

This invention relates generally to the field of fluid filters, and, more particularly, to a filter for removing very small particles from fluids.

A filter is a device through which fluids such as liquids or gases are passed to remove matter suspended in the fluid. One common example is the oil filter of an automobile, through which the liquid oil is passed to remove suspended pieces of dirt, carbon, or other substances before the oil is recirculated to the engine. The particles are removed because they increase the friction and wear on the engine and thereby decrease its life. Similarly, the air to be combusted in an automobile engine is passed through its air filter to remove particles in the air, and the gasoline is also passed through a filter to remove particles therein. Most other types of fluids to be used in critical applications are also filtered in filters specialized to those particular needs.

The most common approach to filtering particles from fluids is to pass the fluid through a porous solid medium, called a filter element, having openings of the porosity that are too small to permit harmful particles to pass. The undesirable particles are thereby trapped on the filter element, which is periodically cleaned or replaced when it becomes dirty with trapped particles.

Paper or wire screen filter elements are widely used, but have significant drawbacks when employed in critical applications wherein the filter is subjected to high temperature or high levels of vibration, or where the filter is inaccessible so that a failure of the filter would be disastrous. For example, filters are used in the fuel and oxidizer lines of rockets and spacecraft to remove any particles suspended in the fluid before it is passed into the valves of the propellant system and into the rocket engine. Should there be a failure of the filter element in such an application, small particles or pieces of the failed filter may find their way to the valves of the propellant system and become deposited on valve seats. The small particles or pieces of filter material on the valve seats prevent the valves from sealing fully in a closed position, endangering the entire spacecraft operation.

Conventional paper or wire filters are particularly susceptible to such failures when designed to remove very small particles. Paper or plastic filters such as millipore filters can remove very small particles, but have filter elements that are mechanically weak and subject to degradation by high temperature or vibration. Wire screen type filters require the use of very fine wires if the particles to be removed are small, on the order of about 10 micrometers in diameter or smaller. Such fine wires are more likely to fail than are coarser wires, with the result that bits of the wire filter element may flow into and damage the propellant system.

Because such filter failures can result in extensive loss, rugged filters have been developed to withstand adverse conditions. In one type of such filter, a filter element is constructed by chemically etching channels into one flat surface of a flat annular ring of solid metal, leaving periodic supports unetched. The filter elements are stacked one against the other so that the supports of one filter element fit against the back side of the next filter element, leaving fluid conduits in the etched portions. The fluid flows through these rings and into the central cavity for collection, so that particles larger than the height of the channels are excluded and thereby cleansed from the fluid.

This type of rugged filter has no thin, weak portions that can be readily broken off or dislodged, and has gained acceptance in many critical applications. While providing acceptable service in filtering particles larger than about 10 micrometers in size, such filters are not generally available for filtering particles of a size less than about 10 micrometers.

There are no rugged filters generally available for filtering particles of less than about 10 micrometers, and certainly no rugged filters available for filtering particles of less than one micrometer in size. A need exists for such filters, for use in spacecraft and other industrial and commercial applications. The present invention fulfills this need, and further provides related advantages.

SUMMARY OF THE INVENTION

The present invention resides in a rugged filter element, filter, and method for their manufacture. Using the filter element of the invention, a filter removes particles of greater than a preselected critical size from a fluid passed through the filter. The critical particle size for filtration can be readily selected by adjusting the manufacturing parameters, and can be varied over a wide range. In particular, the critical size can be made to be less than the critical size possible with other rugged filters. The filter element can be fabricated from a wide variety of materials, and by established process technology steps which can be controlled with great precision.

In accordance with the invention, a filter element comprises a flat base having a thickness direction and a transverse direction, and a layer of a solid material having a substantially constant thickness of less than about 10 micrometers deposited on the flat base, the layer having therein a pattern comprising a plurality of transversely extending continuous channels. Preferably, the channels are formed in the layer but not in the flat base. A corresponding filter for removing particles from a fluid comprises a plurality of filter elements stacked one above the other, each of the filter elements comprising a flat base having a thickness direction and a transverse direction, and a layer of a solid material having a substantially constant thickness of less than about 10 micrometers deposited on the flat base, the layer having therein a pattern comprising a plurality of transversely extending continuous channels; and fluid control means for introducing fluid into and for removing fluid from the channels so that the fluid flows through the channels and is cleansed of particles that are too large to flow through the channels.

Prior rugged fluid filters using a solid filter element have been fabricated by etching out channels from one face of a solid annular flat disk to form the filter element. While this manufacturing technique works well if the channels are to be more than about 10 micrometers deep, the etching procedures used to etch the channels are difficult to control with high precision. In particular, it is not possible with such techniques to reproducibly and accurately etch very shallow, regular channels into a flat surface in the mass production of filter elements.

By contrast, in the present invention filtration channels are produced by depositing a layer on a flat surface, with the layer having a pattern of channels therein as the layer is deposited. Unlike the removal of material by etching, the addition of material by deposition of a layer with a pattern therein can be controlled very accurately over a wide range of layer thicknesses, the layer thickness in turn determining the depth of the channel through which the fluid passes.

In a preferred fabrication procedure, a method for preparing a filter element for use in a fluid filter comprises providing a flat plate; depositing a mask onto the flat plate, the mask having a pattern therein defining a plurality of channels extending transversely across the face of the flat plate; depositing a material over the mask to form a deposited layer, the thickness of the deposited layer being less than about 10 micrometers, the deposited layer having a pattern comprising a plurality of channels; and removing the mask to form a filter element.

Masking techniques are known from the field of microcircuit fabrication. A photosensitive material is deposited on the surface and exposed to projected light in the pattern to be transferred to the photosensitive material. The photosensitive material is developed to form a masking layer on the surface having no mask material where there is to be a final deposited layer. A metal or ceramic is deposited over the mask to form the deposited layer. The mask is removed, also removing the deposited material that is on top of the mask material but leaving the deposited material in the regions where the mask had been removed during developing. The deposited material can be deposited by any of several techniques such as, for example, vapor deposition or electron beam deposition. The deposited layer is permanently and well bonded to the flat plate, usually by a metallurgical bond. These deposition techniques are calibrated to deposit an exact thickness of material, and the thickness of the deposited material defines the height of the filtration channels.

Another important advantage of using the masking and deposition technique is that the shape transverse pattern and course of the channels can be varied as desired. That is, it is desirable to have the fluid change directions several times as it passes through the channels, causing the particles to be lodged into the bends of the channels. Such a highly curved path is termed a "tortuous path", as it is very difficult for a particle to pass through such a channel unless it is significantly smaller than the channel dimension. Photolithographic masks can be made with the defined channels straight or curved in a simple or complex manner, as desired. The masking approach also permits the pattern of the channels to be varied greatly. The channels may be made wide or narrow, and spaced apart or close together. If the channels are narrower than their height, then the width becomes the limiting dimension for the particles. A large number of channels can be provided, as increased fluid flow cross sectional area of the channels reduces the pressure drop across the filter element and the filter.

As indicated, a filter can be prepared by stacking the individual filter elements into a filter stack, and then providing a fluid control means for introducing the dirty fluid to one side of the filter element and removing the clean fluid from the other side. A compact, rugged filter may be prepared by providing interior passages through the filter elements as one portion of the fluid control means, and then using the outside of the filter stack as another portion of the fluid control means. The fluid may be cleaned by passing it from the outside of the filter stack into the interior passages for removal, or from the interior passages to the outside of the filter stack, in either case ensuring that the fluid passes through the channels of the filter stack. The former configuration, with fluid passing from the outside of the filter stack toward the interior passages, is preferred, as the amount of filtered particles that may be retained in the filter is greater than in the latter configuration.

A filter element for use in such a filter is fabricated by adding two further process steps to the procedure described above. After the mask is removed, a second mask is deposited over the deposited layer, the second mask having a pattern therein defining an aperture. Material is then removed from the aperture area defined by the second mask, the material removed including both the deposited layer and the flat plate, to form a passage completely through the filter element. When the filter elements are stacked in registry, the passages align and form an interior passageway for fluid. A closure at the top of the filter stack can be provided with a flat plate, and fluid can flow out of the filter and the other end of the fluid passage.

Thus, in another embodiment of the filter, a filter for removing particles from a fluid comprises a plurality of filter elements stacked in registry with each other to form a filter stack, each of the filter elements comprising a flat base and a layer of a solid material having a substantially constant thickness of less than about 10 micrometers deposited on the flat base, the layer having therein a pattern comprising a plurality of transversely extending continuous channels, each of the filter elements having a hole therethrough in registry with the holes of the other filter elements to form an interior passage through the stack of filter elements; a container surrounding said filter elements and having a port therethrough; a closure at one end of the interior passage to seal the interior passage against fluid leakage at the sealed end; and a tube sealed to the other end of the interior passage, so that fluid may be flowed through the channels to cleanse the fluid of particles contained therein that are too small to pass through the channels.

The filter elements of the invention can be made in large quantities by forming a large number of elements on a single sheet of the flat base material, and then separating the individual filter elements before stacking them. This final procedure is also conveniently accomplished by chemical etching with a mask, to avoid distortion of the filter elements as might be introduced by cutting. This procedure is convenient and economical, as a large number of filter elements can be readily fabricated with the maximum utilization of expensive evaporator equipment.

The most preferred embodiment of the filter element of the invention has been fabricated with both the base and the deposited layer of titanium, and such a filter element may be used in a filter for rocket propellants such as hydrazine. However, it is possible to make the base and the deposited layer of different materials, including a wide variety of metals and nonmetals such as ceramics.

It will now be appreciated that the filter element, filter, and fabrication procedure of the invention represent a significant advance over the art of filters for removing very fine particles from fluids. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 6 is a top plan view of another embodiment of a filter element;

FIG. 7 is a side sectional view of a filter using a plurality of the filter elements of FIG. 6;

FIG. 8 is a diagrammatic flow chart of a method for preparing the filter element of FIG. 1, illustrating the structure at each step of the fabrication process; and FIG. 9 is a top plan view of a large sheet of base material with filter elements fabricated thereupon, before being separated.

DETAILED DESCRIPTION OF THE PREFERRED EMBODIMENT

Figure 1:
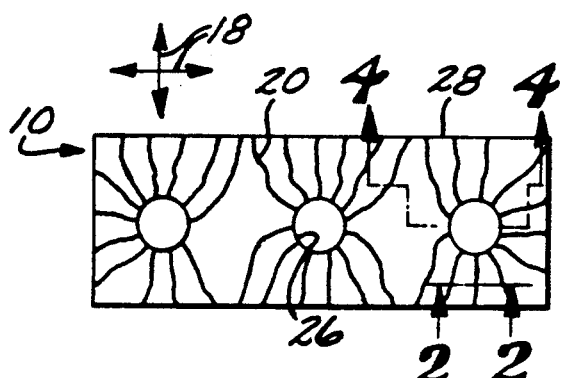
FIG. 1 is a top plan view of a filter element of the invention.
Figure 2:
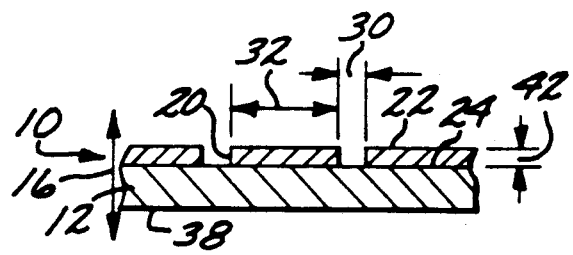
FIG. 2 is a side sectional view of the filter element of FIG. 1, taken generally along line 2—2.

The present invention is embodied, in part, in a filter element 10, illustrated in plan view in FIG. 1 and in section in FIG. 2. The filter element 10 includes a flat base 12 and a layer 14 deposited on the flat base 12, in a manner that forms a permanent bond between the layer 14 and the base 12. The dimensions and directions in respect to the filter element 10 are defined as a thickness direction 16 which is perpendicular to the flat base 12, and a transverse direction 18 which is any direction lying in the plane of the flat base 12.

The layer 14 has a number of channels 20 therein, the depth of the channels 20 extending downwardly in the thickness direction 16 from a top surface 22 of the layer 14 into the layer 14. The channels 20 extend downwardly to a top surface 24 of the flat base 12, but not into the material of the flat base 12.

There is at least one, and preferably three, passages 26 extending in the thickness direction 16 downwardly from the top surface 22 of the layer 14 through the layer 14 and also through the flat base 12, forming passageways entirely through the filter element 10. The passages 26 are illustrated as circular in plan view, but need not be so. The passages 26 are distinguished from the channels 20 in that the channels 20 extend in the thickness direction 16 downwardly through only a portion of the thickness of the filter element 10, while the passages 26 extend in the thickness direction 16 through the entire thickness of the filter element 10.

The channels 20 extend in the transverse direction 18 from the passages 26 to the perimeter 28 or outer edge of the filter element 10, forming a continuous path from the passages 26 to the perimeter 28. The channels are illustrated in FIG. 1 as following a curved path in the transverse direction 18, which is preferred over a straight path.

Figure 3:
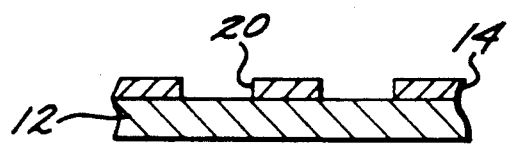
FIG. 3 is a side sectional view of a filter element, in a view similar to that of FIG. 2, illustrating another configuration of the channels of the filter element.

The width 30 of the channels 20 can be less than the spacing 32 between the channels 20, as illustrated in FIG. 2. An alternative embodiment, FIG. 3, has the width 30 of the channels 20 greater than the spacing 32 between the channels 20. The width 30 of the channels 20 could also be equal to the spacing 32 between the channels 20. The relative spacings and widths of the channels need not be uniform throughout the filter element, and in normal practice there are a variety of relative widths and spacings as the channels become closer to each other near to the passages, as illustrated in FIG. 1. Normally, however, the width of the channels will ordinarily be maintained either greater than or less than the spacing between the channels throughout the entire filter element.

Figure 4:
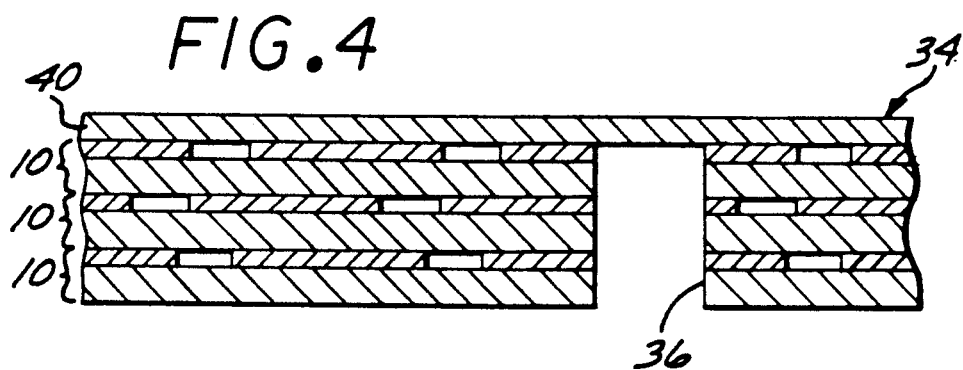
FIG. 4 is a side sectional view of three filter elements of the type illustrated in FIG. 1, stacked in registry on each other, taken generally along the line represented by 4—4 in FIG. 1, for one of the elements.

In operation, a plurality of the filter elements 10 are stacked upon each other to form a filter stack, as illustrated in FIG. 4 for a short filter stack 34 having only three filter elements 10. (Normally, there are several hundred filter elements 10 stacked to form a filter stack.) Each filter element 10 is pressed against its neighboring filter element, with the passages 26 in registry to form a continuous passageway 36 through the filter stack 34. The top surface 22 of the layer 14 of each filter element 10 is pressed against a bottom surface 38 of the adjacent filter element 10. The channels 20 are thereby closed on the remaining open side, so that all four lateral surfaces of the channels 20 are closed, and the channels will retain fluid therein under pressure. Each channel 20 therefore forms a communicating conduit from the perimeter of the filter element 10 to one of the passages 26. The registry of the passages 26 forms a further communicating conduit for the flow of fluid along the passageways 36. A closure plate 40 closes the passageways 36 at one end thereof, and also closes the remaining lateral surface of the channels 20 in the topmost of the filter elements 10 that is in contact with the closure plate 40.

Fluid to be cleaned is introduced under pressure either to the perimeter 28 of the filter elements 10 or into the passageways 36. Preferably, the fluid is introduced to the perimeter 28, and the following discussion will describe this preferred approach. Fluid under pressure is forced from the perimeter 28 of the filter elements 10 into the conduits formed by the channels 20. The fluid flows through the channels 20 to the passageways 36, and flows out of the filter stack 34 to be collected.

Cleansing and filtration of the fluid is achieved by removing from the fluid those particles that are too large to flow through the channels 20. Some of the particles removed are too large to even enter the channels 20, while others enter the channels 20 and are trapped at some point therein. The trapping of particles within the channels 20 is facilitated by changing the direction of fluid flow in the channels 20 several times. The channels 20 are therefore curved in the manner illustrated in FIG. 1, so that the fluid and particles flowing therethrough follow a curved or "tortuous" path to trap particles in the channels 20.

The maximum size of particle that is permitted to flow through the channels 20 without being removed, termed the "critical" sized particle, is determined by the dimensions of the channel 20. The width 30 of the channel 20 is one dimension, while the height 42 of the layer 14 in the thickness direction is the other dimension. In the prior art etching techniques, neither dimension of the channel could be made small, because the depth of etching and the undercutting and broadening effects of etching cannot be readily controlled. In the present filter element 10, the height of the channel 20 is determined by the thickness of the material deposited to form the layer 12. This thickness can be controlled very accurately in any of a variety of deposition techniques. The width of the channel 20 is not broadened by the deposition technique, as the channel is formed while the deposition occurs. Using the techniques to be described subsequently, the width of the channel 20 can be controlled precisely, as well as the height.

It will be appreciated, therefore, that the structure of the filter element of the present invention, a layer having channels and deposited upon a base, is distinguished from the conventional filter element wherein channels are etched from a flat piece of annular stock. Deposition of a layer permits the fabrication of channels having dimensions smaller than possible with etching. Thus, as used herein, reference to a "deposited layer" in forming channels distinguishes an etching approach for forming the channels. Etching simply does not permit the accurate dimensional control required for reproducibly forming very small channels in the filter element. While studies have been performed in which small amounts of material are etched away, there is no commercial method for performing such precise, highly controlled etching procedures with sufficient reproducibility to manufacture a large number of filter elements having substantially identical channels.

The absolute and relative dimensions of the channels 20 can also be varied by the deposition procedures. The smaller of the height and width dimension of the channels 20 normally determines the critical size of the particles, but various combinations may be utilized when, for example, the particles are irregular or are mixes of irregular and regular particles. Presently available deposition techniques enable the height of the layer to be made less than 10 micrometer, and less than about 1 micrometer upon demand. The masking techniques permit the channel width to be made as small as about 0.1 micrometer.

Figure 5:
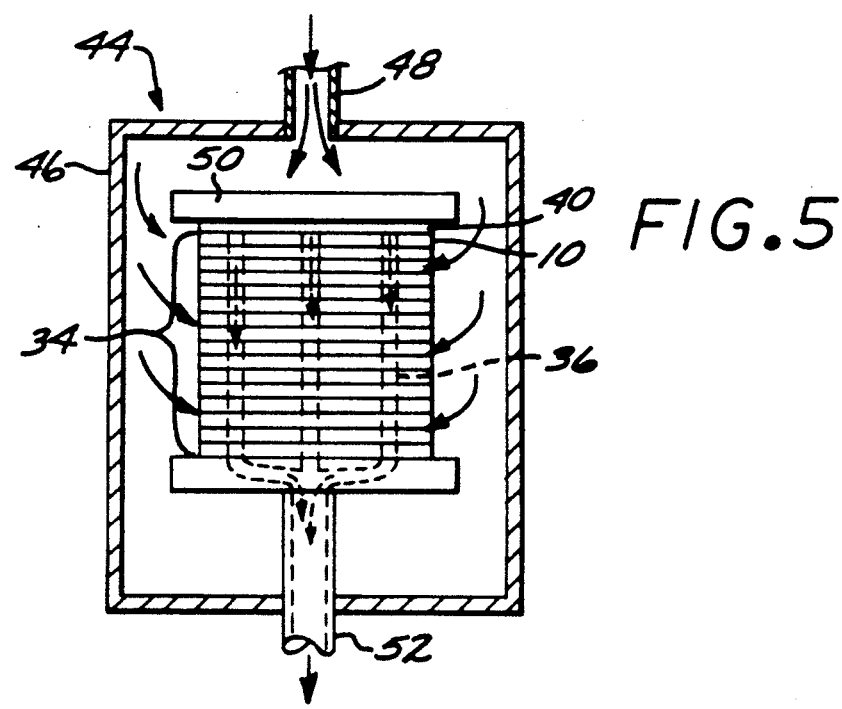
FIG. 5 is a side sectional view of a filter using a plurality of the filter elements of FIG. 1.

FIG. 5 illustrates a filter 44 formed from filter elements 10 of the type discussed. The filter 44 includes a container 46 having a port 48 therein. The filter stack 34, having a top closure plate 40, and typically including several hundred filter elements 10, is enclosed within the container 44. A stack retaining structure 50 compresses the filter stack 34 along the thickness direction 16. The filtered fluid flowing out of the passageways 36 of the filter stack 34 is collected in a tube 52 to be drained away. The walls of the container 44 are removably sealed to the tube 52, so that fluid must flow through the channels of the filter stack 34.

In the operation of this filter 44, dirty fluid containing particles is introduced through the port 48 under pressure. The fluid is forced to flow through the channels of the filter elements making up the filter stack 34, removing particles larger than the critical size. Clean fluid, containing only particles smaller than the critical size, flows from the channels of the filter stack 34 into the passageways 36 and thence out of the filter 44 through the tube 52.

The filter element 10 and filter 44 are the preferred article embodiments of the present invention, but other articles utilizing the principles and function of the invention may be fabricated. FIG. 6 is a top plan view of another form of filter element 60 having the same general construction as described for the filter element 10, except that the channels 62 extend from one lateral side of the filter element 60 to the other. That is, there is no passage 26, passageway 36, or comparable structure in the filter element 60, so that the fluid must be made to flow across the lateral extent of the filter element 60 through the channels 62, in order to cleanse the fluid of particles larger than the critical size.

FIG. 7 illustrates a filter 64 that may be used to take advantage of the cleansing properties of the filter element 60. In the filter 64, a filter stack 66 of the filter elements 60 is compressed between the walls of a container 68. Dirty fluid flows into the container 68 through an entry port 70 under pressure, and is forced to flow through the channels 62 of the filter elements 60 in the filter stack 66. The flow through the filter stack 66 cleans particles of greater than the critical size from the fluid, and the clean fluid flows out of the filter 64 through an exit port 72. This form of filter 64 is less preferred than the preferred filter 44, as additional seals with the sides of the container 68 are required.

It is apparent that other embodiments of the filter element and the filter of the present invention may be made, in which dirty fluid is forced to flow through the channels of the filter element to cleanse it of the particles therein. An embodiment such as that illustrated in FIG. 5 has the particular advantage that it may be disassembled readily for cleaning of trapped particles from the filter elements and filter stack. To clean such a filter, the container of the filter is opened, the stack retaining structure removed, and the filter stack pulled apart so that individual filter elements can be cleaned. The filter is also readily reassembled by reversing these steps.

The diagrammatic flow chart of FIG. 8 illustrates the preferred process for fabricating the preferred filter element 10 of FIGS. 1 and 2. A flat base 12 is provided. A patterned mask 80 is deposited onto the flat base 12. The patterned mask is typically provided by depositing a thin layer of a photosensitive polymer photoresist material, such as Shipley AZ1315J, onto the flat base 12. A pattern of channels is projected optically onto the photosensitive polymer to expose it, and the exposed areas of the polymer are removed (assuming the use of a negative photoresist) by developing in an appropriate developer. This type of technique is well known in the manufacture of microelectronic devices. It permits the definition of channels of precise width and transverse direction, and the precise definition of the arrays of channels.

The material of the layer 14 is then deposited over the mask 80 to the desired thickness. Deposition is typically accomplished by vapor deposition, electron beam deposition, or another technique by which a layer 14 of precisely controlled, uniform thickness is deposited. The deposited material fills the spaces between the mask material, where the mask material has been removed, and deposits on top of the mask material where it has not been removed. The mask 80 is then removed by dissolution, taking with it the material that was deposited on top of the mask material and leaving the material that was deposited directly upon the base 12. The regions between the material deposited on the base 12 become the channels, as there remains no deposited material in these regions.

If the particular filter element being fabricated includes passages 26 through the entire filter element 10, the passages 26 can be formed by applying a second mask 82 over the previously deposited structure. A layer of photosensitive polymer photoresist material is placed onto the previously deposited structure, and exposed in the shape of apertures. The photoresist material is developed to remove the material within the space defined by the apertures (assuming a positive photoresist material). This exposes an opening through the photoresist in the shape of the passages 26 as viewed in a plan view. The layer 14 and the flat base 12 within the opening through the photoresist are removed by etching, leaving the passage 26 completely through the filter element 10. It will be noted that the passages 26 can be formed by etching procedures, since their depth need not be controlled accurately. The use of etching procedures at this stage of fabrication is distinguished from its absence of use in forming the channels 20, since the depth and cross sectional width of the channels 20 must be controlled very accurately. The etchant used to define the passages 26 does not contact the remaining channels 20, since they are protected by the material of the second mask 82.

In one further aspect of the process for fabricating filter elements, a large number of filter elements can be fabricated simultaneously with the configuration indicated in FIG. 9. A large sheet of the base material is furnished, and a large number of filter elements are fabricated simultaneously side-by-side on this base. When the filter element fabrication is complete, the individual filter elements are separated from each other, preferably by applying a third mask to the filter elements and then separating the elements by chemical etching. This general approach to the fabrication of a large number of similar devices is practiced in the microelectronics field. It has the particular advantage that the use of fabrication machinery such as evaporators is optimized, thereby reducing the cost of each filter element, and the handling required for each filter element is minimized.

The filter element of the present invention may be made of a wide variety of different materials. The base is furnished as a flat sheet, and the layer material must be evaporable from a source. Techniques are available for evaporating most pure metals and alloys, as well as many ceramics and semiconductors. The layer material can be doped, if desired, during evaporation. The materials used in the flat base and the layer can be selected to meet particular needs, such as corrosion resistance in the fluid to be filtered. The base can be made as a composite, with several layers of structure within the base if desired.

As will now be appreciated, the filter element of the present invention permits the construction of filters that can remove very small particles from fluids. The filter element is readily fabricated and assembled into a filter stack, and the stack is in turn readily disassembled for cleaning. The filter and filter element are rugged, and resistant to temperature degradation, vibration, and corrosion without failure of the filter or element.

Although a particular embodiment of the invention has been described in detail for purposes of illustration, various modifications may be made without departing from the spirit and scope of the invention. Accordingly, the invention is not to be limited except as by the appended claims.

What is claimed is:

1. A filter element, comprising:
a flat base having a thickness direction and a transverse direction; and
a layer of a solid material having a substantially constant thickness of less than about 10 micrometers deposited on said flat base, said layer having therein a pattern comprising a plurality of transversely extending continous channels.

2. The filter element of claim 1, wherein said channels are formed in said layer but not in said flat base.

3. The filter element of claim 1, wherein the thickness of said channels is less than the spacing between channels.

4. The filter element of claim 1, wherein said solid material making up said layer is titanium.

5. The filter element of claim 1, wherein said flat base and said layer are of different materials.

6. The filter element of claim 1, wherein said layer is made of a material selected from the group consisting of a metal and a ceramic.

7. The filter element of claim 1, further including a passage through said flat base and said layer in the thickness direction, and said channels extend from said passage to the periphery of said filter element.

8. The filter element of claim 1, wherein the thickness of said layer is about 1 micrometer.

9. A filter for removing particles from a fluid, comprising:
a plurality of filter elements stacked one above the other, each of said filter elements comprising a flat base having a thickness direction and a transverse direction, and a layer of a solid material having a substantially constant thickness of less than about 10 micrometers deposited on said flat base, said layer having therein a pattern comprising a plurality of transversely extending continuous channels; and
fluid control means for introducing fluid into and for removing fluid from said channels so that the fluid flows through said channels and is cleansed of particles that are too large to flow through said channels.

10. The filter element of claim 9, wherein the thickness of said channels is less than the spacing between channels.

11. The filter element of claim 9, wherein said solid material making up said layer is titanium.

12. The filter element of claim 9, wherein said flat base and said layer are of different materials.

13. The filter element of claim 9, wherein said layer is made of a material selected from the group consisting of a metal and a ceramic.

14. The filter element of claim 9, further including a passage through said flat base and said layer in the thickness direction.

15. The filter element of claim 9, wherein the thickness of said layer is about 1 micrometer.

16. A filter for removing particles from a fluid, comprising:
a plurality of filter elements stacked in registry with each other to form a filter stack, each of said filter elements comprising a flat base and a layer of a solid material having a substantially constant thickness of less than about 10 micrometers deposited on said flat base, said layer having therein a pattern comprising a plurality of transversely extending continuous channels, each of said filter elements having a hole therethrough in registry with the holes of the other filter elements to form an interior passage through the stack of filter elements;
a container surrounding said filter elements and having a port therethrough;
a closure at one end of the interior passage to seal the interior passage against fluid leakage at the sealed end; and
a tube sealed to the other end of the interior passage, so that fluid may be flowed between said port and said tube through said channels to cleanse the fluid of particles contained therein that are too small to pass through said channels.

17. The filter element of claim 16, wherein the thickness of said channels is less than the spacing between channels.

* * * * *